United States Patent
Jaw et al.

(10) Patent No.: US 12,233,630 B2
(45) Date of Patent: Feb. 25, 2025

(54) IN-MOLD ELECTRONIC COMPONENT AND METHOD FOR MANUFACTURING THE SAME

(71) Applicants: Interface Technology (ChengDu) Co., Ltd., Chengdu (CN); Interface Optoelectronics (Shenzhen) Co., Ltd., Shenzhen (CN); General Interface Solution Limited, Miaoli County (TW)

(72) Inventors: Ten-Hsing Jaw, Chengdu (CN); Han Lung Tsai, Chengdu (CN); I-chang Kuan, Chengdu (CN)

(73) Assignees: Interface Technology (ChengDu) Co., Ltd., Chengdu (CN); Interface Optoelectronics (Shenzhen) Co., Ltd., Shenzhen (CN); General Interface Solution Limited, Miaoli County (TW)

( * ) Notice: Subject to any disclaimer, the term of this patent is extended or adjusted under 35 U.S.C. 154(b) by 1000 days.

(21) Appl. No.: 17/203,451

(22) Filed: Mar. 16, 2021

(65) Prior Publication Data

US 2021/0345490 A1 Nov. 4, 2021

(30) Foreign Application Priority Data

Apr. 29, 2020 (CN) .......................... 202010354699.7

(51) Int. Cl.
*B32B 3/26* (2006.01)
*B32B 27/06* (2006.01)

(52) U.S. Cl.
CPC .............. *B32B 3/266* (2013.01); *B32B 27/06* (2013.01); *B32B 2457/20* (2013.01)

(58) Field of Classification Search
CPC ...... B32B 3/266; B32B 27/06; B32B 2457/20
(Continued)

(56) References Cited

U.S. PATENT DOCUMENTS 10,057,989 B1 8/2018 Heikkinen et al.
10,225,932 B1 3/2019 Simula et al.
(Continued)

FOREIGN PATENT DOCUMENTS

CN 203178633 U 9/2013
CN 110475430 A 11/2019
(Continued)

OTHER PUBLICATIONS

First Office Action in related Chinese Application No. 202010354699. 7, issued Apr. 22, 2022, 15 pages.
(Continued)

*Primary Examiner* — Betelhem Shewareged
(74) *Attorney, Agent, or Firm* — Polsinelli PC; Simon Booth

(57) ABSTRACT

An in-mold electronic component includes a first film layer, a functional module, a plastic layer, and a lead-out terminal. The first film layer is provided at a top surface of the in-mold electronic component. The functional module includes a circuit layer and an electronic component electrically connected to circuit layer. The plastic layer is configured to seal the functional module. One end of the lead-out terminal is electrically connected to the circuit layer, and the other end of the lead-out terminal is led out to a rear surface of the in-mold electronic component.

11 Claims, 8 Drawing Sheets

(58) Field of Classification Search
USPC .......................................................... 428/201
See application file for complete search history.

(56) References Cited

U.S. PATENT DOCUMENTS

| | | | |
|---|---|---|---|
| 10,485,094 B1 | 11/2019 | Isohatala et al. | |
| 2010/0140359 A1 | 6/2010 | Hamm et al. | |
| 2010/0144948 A1* | 6/2010 | Hirano | C08K 3/28 524/544 |
| 2012/0314348 A1 | 12/2012 | Moncrieff | |
| 2017/0009477 A1 | 3/2017 | Heikkinen et al. | |
| 2017/0142827 A1 | 5/2017 | Cheng et al. | |
| 2018/0005986 A1 | 3/2018 | Zheng et al. | |
| 2019/0006940 A1 | 2/2019 | Keranen et al. | |
| 2019/0042030 A1* | 2/2019 | Saaski | B32B 3/266 |
| 2019/0069409 A1* | 2/2019 | Keranen | H05K 1/0203 |
| 2019/0287892 A1* | 9/2019 | Sääski | H01L 23/50 |
| 2019/0038640 A1 | 12/2019 | Lee et al. | |
| 2021/0345490 A1* | 11/2021 | Jaw | H05K 3/284 |

FOREIGN PATENT DOCUMENTS

| | | |
|---|---|---|
| CN | 110858013 A | 3/2020 |
| JP | 1971114245 U | 10/1973 |
| JP | H01283617 A | 11/1989 |
| JP | 2009177117 A | 8/2009 |
| JP | 3200683 U | 10/2015 |
| JP | 2016-189450 A | 11/2016 |
| KR | 20190135050 A | 12/2019 |
| WO | 2016/041259 A1 | 3/2016 |
| WO | 2019073581 A1 | 4/2019 |

OTHER PUBLICATIONS

Notice of Reasons for Refusal in related Japanese Patent Application No. 2021-064939, drafted Feb. 22, 2022, 16 pgs.
Office Action in related Taiwan Application No. 110111590, issued Nov. 24, 2021, 16 pages.
European Search Report in related EP Application No. 21162652.8, dated Aug. 26, 2021, 7 pages.

* cited by examiner

IN-MOLD ELECTRONIC COMPONENT AND METHOD FOR MANUFACTURING THE SAME

CROSS REFERENCE TO RELATED APPLICATION

This application claims priority to Chinese Patent Applications No. 2020103546997, filed on Apr. 29, 2020, entitled "IN-MOLD ELECTRONIC COMPONENT AND METHOD FOR MANUFACTURING THE SAME", and the entire content of which are incorporated herein by reference.

TECHNICAL FIELD

The present disclosure relates to a field of In-Mold Electronic (IME) technology, and in particular, to an in-mold electronic component and a method for manufacturing the same.

BACKGROUND

Appearance structures such as conventional home appliances, automotive interior parts, consumer electronic products are generally assembled by components such as plastic components and integrated circuit boards behind the plastic components. The integrated circuit board includes a printed circuit board and an electronic component welded to the printed circuit board, and has disadvantages such as complex structure, heavy volume, cumbersome manufacturing process, poor waterproof performance, poor weather resistance, and poor impact resistance.

SUMMARY

According to various embodiments, an in-mold electronic (IME) component and a method for manufacturing the same are provided.

An in-mold electronic component includes a first film layer, a functional module, a plastic layer, and a lead-out terminal. The first film layer is provided at a top surface of the in-mold electronic component. The functional module includes a circuit layer and an electronic component electrically connected to circuit layer. The plastic layer is configured to seal the functional module. One end of the lead-out terminal is electrically connected to the circuit layer, and the other end of the lead-out terminal is led out to a rear surface of the in-mold electronic component. The rear surface is provided opposite to the top surface.

A method for manufacturing an in-mold electronic component includes: printing a decorative layer on a side of a first film layer; forming a via hole in a second film layer, and filling the via hole with a conductive material; printing a circuit layer and a conductive layer on a side of the second film layer, and patterning the conductive layer to form a touch unit electrically connected to the circuit layer, the circuit layer being electrically connected to the conductive material; electrically connecting a display unit to the circuit layer; forming a plastic layer between the first film layer and the second film layer through an injection molding process, the plastic layer being configured to seal the decorative layer, the circuit layer, the display unit, and the touch unit; and binding an end of the conductive material away from the circuit layer to a flexible printed circuit.

A method for manufacturing an in-mold electronic component includes: printing a decorative layer on a side of a first film layer; printing a circuit layer and a conductive layer on the decorative layer, and patterning the conductive layer to form a touch unit electrically connected to the circuit layer; electrically connecting a display unit to the circuit layer, and fixing a connecting pin of a pin header to the circuit layer; and forming a plastic layer on a side of the circuit layer away from the first film layer through an injection molding process, and enabling a pin head of the pin header to protrude from the plastic layer.

According to the above in-mold electronic components and methods for manufacturing the same, structures and connecting relationships between the first film layer, the functional module, the plastic layer and the lead-out terminal are rationally deployed such that the first film layer is provided at the top surface of the in-mold electronic component, the functional module is sealed in the plastic layer, and one end of the lead-out terminal is electrically connected to the circuit layer, and the other end of the lead-out terminal is led out to the rear surface of the in-mold electronic component. Therefore, on the one hand, the appearance structure of the in-mold electronic component is lighter and thinner, and is not detachable, and has advantages of moisture resistance, weather resistance, impact resistance and the like. On the other hand, the electronic component sealed in the plastic layer can be directly electrically connected to the external components through the lead-out terminal, connecting cables can be avoided, thereby avoiding the bending and brittle fracture of the connecting cables, and thus ensuring the reliability of the electrical connection between the electronic component sealed in the plastic layer and the external components.

Details of one or more embodiments of the present application are set forth in the attached drawings and description. Other features, purposes and advantages of the present application will become apparent from the description, drawings, and claims.

BRIEF DESCRIPTION OF THE DRAWINGS

To illustrate the technical solutions according to the embodiments of the present disclosure or prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

Figure 1:
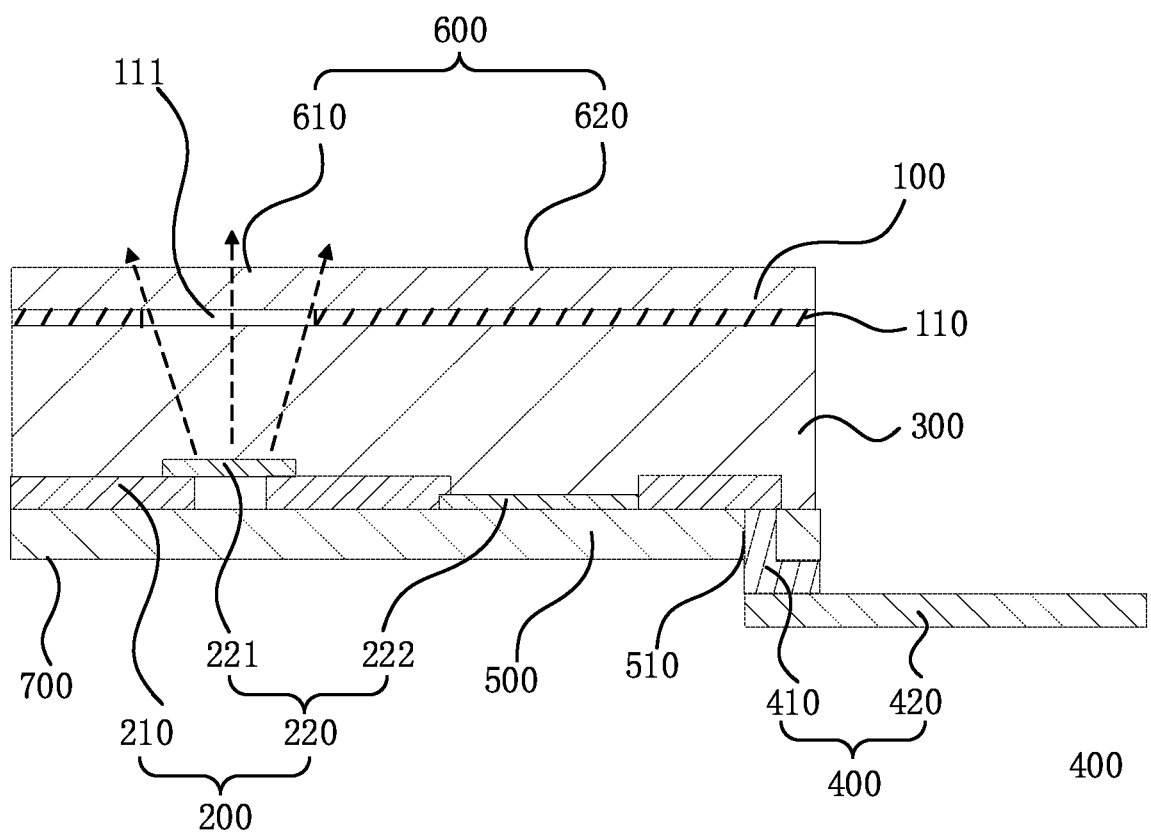
FIG. 1 is a cross-sectional view of an in-mold electronic component according to an embodiment.

In order to make the above objects, features and advantages of the present disclosure more obvious and understandable, the specific embodiments of the present disclosure will be illustrated in detail below in conjunctions with the accompanying drawings. In the following description, many specific details are set forth in order to assist readers in fully understanding of the present disclosure. However, the present disclosure can be implemented in many other ways than described herein, and those skilled in the art can make similar improvements without departing from the connotation of the present disclosure. Therefore, the present disclosure is not limited by the specific embodiments disclosed below.

In the description of the present disclosure, it should be understood that orientation or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on orientation or positional relationship shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features described. Thus, the features defined with "first" and "second" may include at least one of the features explicitly or implicitly. In the description of the present disclosure, the meaning of "plurality" is at least two, such as two, three, etc., unless explicitly defined otherwise.

In the present disclosure, unless explicitly specified and limited otherwise, the terms "mounting", "connecting", "connected", "fixed" and the like should be understood in a broad sense. For example, it may be a fixed connection or a detachable connection, or an integration, may be a mechanical connection or electrical connection, may be a direct connection, or may be an indirect connection through an intermediate medium, may be the connection between two elements or the interaction relationships between two elements, unless explicitly defined otherwise. The specific meanings of the above terms in the present disclosure can be understood by one of those ordinary skills in the art according to specific circumstances.

In the present disclosure, unless explicitly specified and limited otherwise, the first feature being "on" or "below" the second feature may be that the first and second features are in a direct contact, or the first and second features are in an indirect contact through an intermediate medium. Moreover, the first feature being "over", "above" and "on" the second feature may be that the first feature is directly above or obliquely above the second feature, or simply means that the first feature is higher than the second feature in horizontal direction. The first feature being "beneath", "under", and "below" the second feature may be that the first feature is directly below or obliquely below the second feature, or simply means that the first feature is lower than the second feature in horizontal direction.

It should be noted that when an element is referred to as being "fixed" or "disposed on" another element, it may be directly on another element or there may also be an intermediate element therebetween. When an element is considered to be "connected" to another element, it may be directly connected to another element or there may be an intermediate element therebetween. As used herein, the terms "vertical", "horizontal", "upper", "lower", "left", "right", and similar expressions are for illustration only and are not meant to be the only embodiments.

Appearance structures such as conventional home appliances, automotive interior parts, consumer electronic products are generally assembled by components such as plastic components and integrated circuit boards behind the plastic components. The integrated circuit board includes a printed circuit board and an electronic component welded to the printed circuit board, and has disadvantages such as complex structure, heavy volume, cumbersome manufacturing process, poor waterproof performance, poor weather resistance, and poor impact resistance.

In order to solve the above problems, an in-mold electronic (IME) component has proposed. The IME component is formed by sealing a circuit board and an electronic component on the circuit board in a plastic component through an injection molding process. In order to electrically connect the electronic component sealed in the plastic component to external components, it is generally necessary to lead the circuit board and a printed circuit on the circuit board out of the plastic component by arranging connecting cables, and bend it to a rear surface of the IME component, to facilitate the electrical connection to the external components. However, in a process of forming the IME component, a high-temperature injection molding process is required to be performed, and thus a substrate of the circuit board is easy to age and become brittle. Therefore, the circuit board corresponding to the wiring and the printed circuit on the circuit board are prone to brittle fracture when bent, resulting in failure of the electrical connection to the external components.

Figure 2:
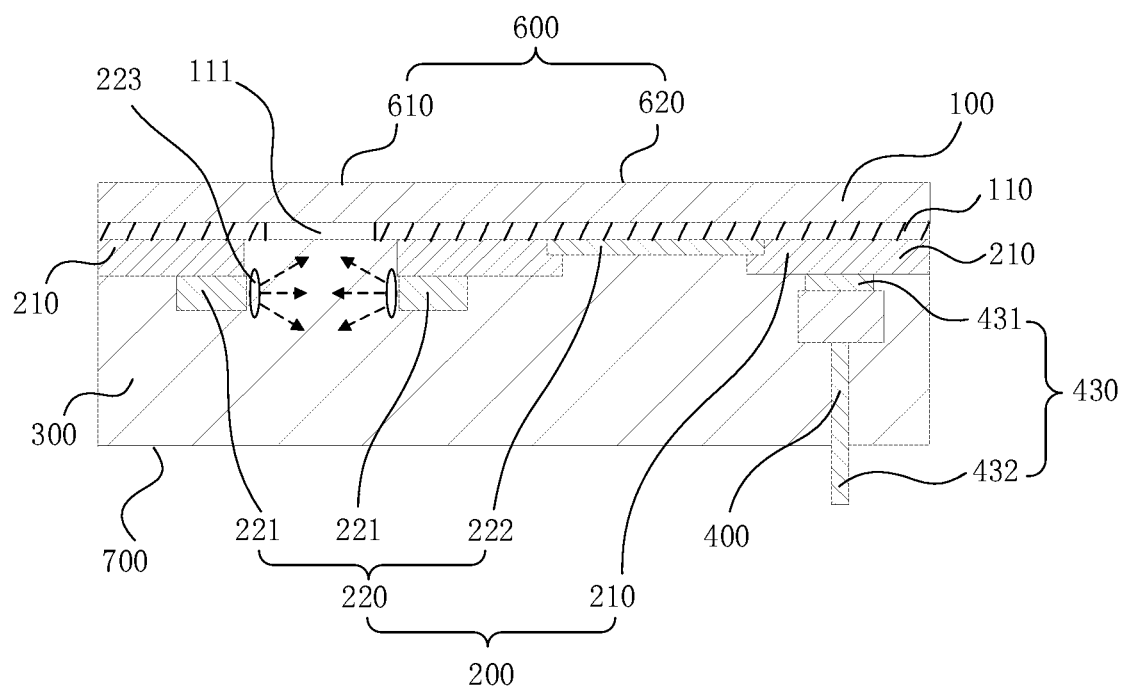
FIG. 2 is a cross-sectional view of an in-mold electronic component according to another embodiment.

In order to solve the above problems, an IME component is provided. As shown in FIGS. 1 and 2, in an embodiment, the IME component includes a first film layer 100, a functional module 200, a plastic layer 300, and a lead-out terminal 400. The first film layer 100 is provided at a top surface 600 of the IME component. The functional module 200 includes a circuit layer 210 and an electronic component 220. The electronic component 220 includes a display unit 221 and a touch unit 222. The display unit 221 and the touch unit 222 are both electrically connected to the circuit layer 210. The top surface 600 of the IME component includes a display area 610 and a touch area 620. The display area 610 is positioned corresponding to the display unit 221, and the touch area 620 is positioned corresponding to the touch unit 222. Information generated by the display unit 221 can be displayed on the display area. The plastic layer 300 is used to seal the functional module 200. One end of the lead-out terminal 400 is electrically connected to the circuit layer 210, and the other end of the lead-out terminal 400 is lead out to a rear surface 700 of the IME component. The rear surface 700 and the top surface 600 of the IME component are provided opposite to each other. By providing the lead-out terminal 400, the electronic component 220 sealed in the plastic layer 300 can be directly electrically connected to external components, the connecting cables can be avoided, thereby avoiding the bending and brittle fracture of the connecting cables, ensuring the reliability of the electrical connection.

Figure 4:
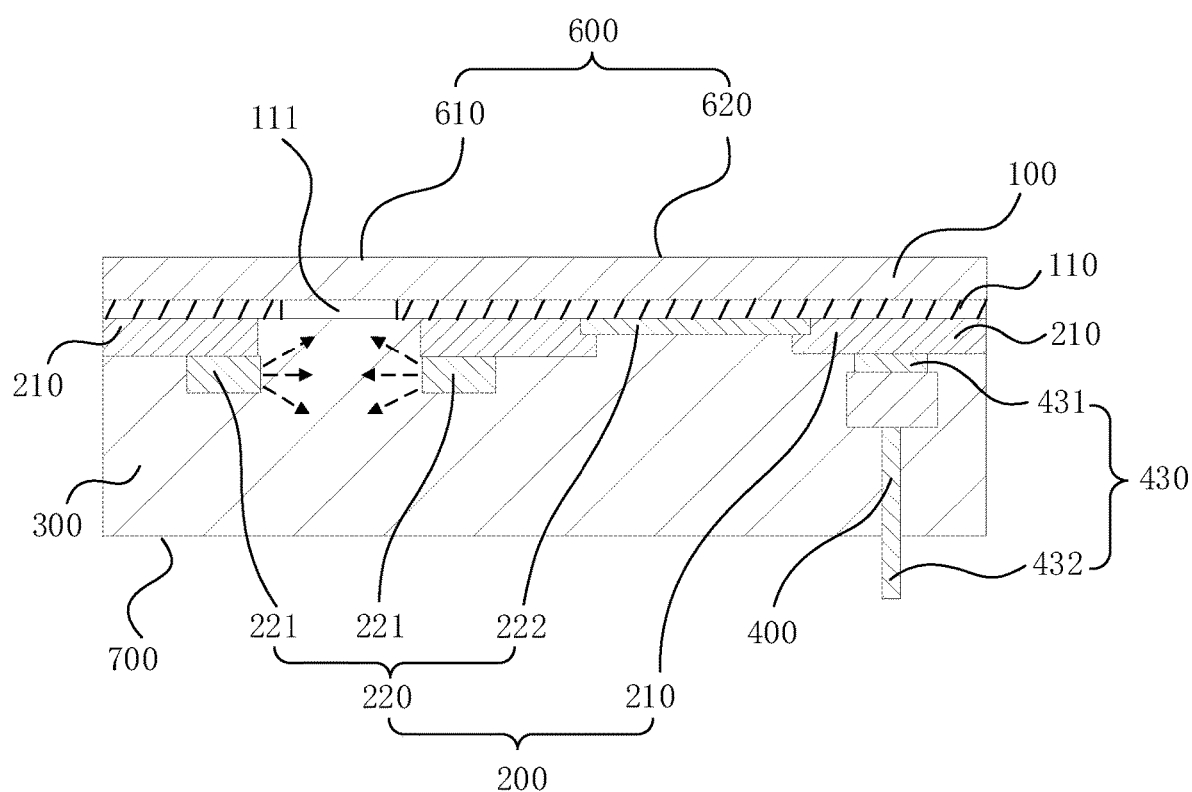
FIG. 4 is a cross-sectional view of an in-mold electronic component according to another embodiment.

In a specific embodiment, as shown in FIGS. 1 and 4, the display unit 221 is an LED lamp. Light emitted by the LED lamp is indicated by dotted lines in FIGS. 1 and 4. The light is distributed in the display area 610 of the IME component. The light emitted by the LED lamp can go through the display area 610 of the IME component. The touch unit 222 includes a transparent conductive layer. The transparent conductive layer can be made of conductive materials, such as indium tin oxide (ITO), indium zinc oxide (IZO), fluorine-doped tin oxide (FTO), aluminum-doped zinc oxide (AZO), gallium-doped Zinc oxide (GZO), antimony doped tin oxide (ATO), polyethylene dioxythiophene (PEDOT), transparent conductive polymer materials, graphene, carbon nanotubes or metal mesh.

In an embodiment, as shown in FIG. 1, the IME component further includes a second film layer 500. The second film layer 500 is provided on the rear surface 700 of the IME component. The plastic layer 300 is located between the first film layer 100 and the second film layer 500. The circuit layer 210 is located at a side of the second film layer 500 adjacent to the plastic layer 300. The first film layer 100 is provided with a decorative layer 110 on a side thereof away from the top surface 600. The decorative layer 110 is provided with a through hole 111 at a position corresponding to the display unit 221. The light emitted by the display unit 221 can go through the display area 610 of the IME component through the through hole 111. In addition, as shown in FIG. 1, the second film layer 500 is provided with a via hole 510. The via hole 510 is filled with a conductive material 410. The lead-out terminal 400 includes a flexible printed circuit (FPC) 420 and the conductive material 410 filled in the via hole 510. One end of the conductive material 410 is electrically connected to the circuit layer 210, and the other end of the conductive material 410 is electrically connected to the FPC 420, such that the electronic component 220 sealed in the plastic layer 300 can be electrically connected to the external components sequentially through the circuit layer 210, the conductive material 410 in the via hole 510, and the FPC 420.

In an embodiment, the circuit layer 210 may be made of conductive silver paste, conductive carbon paste, or conductive copper paste, but is not limited hereto. The circuit layer 210 is formed on the second film layer 500 by printing. Methods of printing include inkjet printing, offset printing, gravure printing, screen printing, and flexographic printing, but are not limited hereto. The conductive material 410 in the via hole 510 may be conductive silver paste, conductive carbon paste, or conductive copper paste, but is not limited hereto. In one embodiment, the conductive material 410 in the via hole 510 can be filled in the via hole 510 by double-sided printing.

Figure 8:
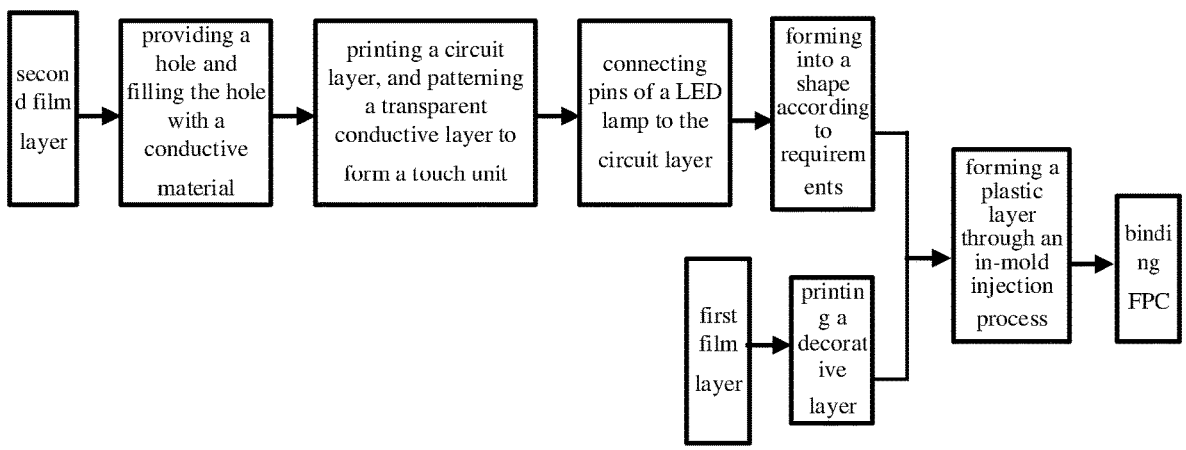
FIG. 8 is a flowchart of a method for manufacturing an in-mold electronic component according to an embodiment.

In an embodiment, a method for manufacturing the IME component shown in FIG. 1 is shown in FIG. 8. Firstly, the decorative layer 110 is printed on a side of the first film layer 100, and then, the via hole 510 is formed in the second film layer 500 by laser or computer numerical control (CNC) process, and then, the conductive material 410 is filled in the via hole 510 by double-sided printing. Then, the circuit layer 210 is printed on the second film layer 500, and the transparent conductive layer is provided on the circuit layer 210. Then, the transparent conductive layer is patterned by etching or other processes to form the touch unit 222 electrically connected to the circuit layer 210. Then, pins of the LED lamp are connected to the circuit layer 210, such that the circuit layer 210, the display unit 221 and the touch unit 222 are all integrated on one side of the second film layer 500. Then, the second film layer 500 is processed according to specific requirements. For example, the second film layer 500 can be bent into a curved surface, such that sizes and shapes of the second film layer 500 and the functional module 200 on the second film layer 500 can meet specific size and shape requirements. Then, the first film layer 100 and the second film layer 500 are provided on an inner surface of a mold cavity of a mold. The decorative layer 110 on the first film layer 100 is placed close to the mold cavity of the mold. The circuit layer 210, the display unit 221, and the touch unit 222 on the second film layer 500 are also placed close to the mold cavity of the mold. Then, a high-temperature molten plastic material is injected into the mold cavity of the mold through the injection molding process to form the plastic layer 300. The decorative layer 110 on the first film layer 100, the circuit layer 210, the display unit 221, and the touch unit 222 on the second film layer 500 are sealed in the plastic layer 300 through the plastic layer 300. Finally, the conductive material 410 filled in the via hole 510 of the second film layer 500 is bound to the FPC 420 at an end away from the circuit layer 210.

In the embodiment shown in FIG. 1, the via hole 510 is formed in the second film layer 500, and the conductive material 410 is filled in the via hole 510. On the one hand, the electronic component 220 sealed in the plastic layer 300 can be directly electrically connected to the external components through the conductive material 410 in the via hole 510, the connecting cables can be avoided, thereby avoiding the bending and brittle fracture of the connecting cables, and thus ensuring reliability of the electrical connection between the electronic component 220 in the plastic layer 300 and the external components. On the other hand, the conductive material 410 can further seal the via hole 510 on the second film layer 500 to prevent high-temperature molten plastic fluid from flowing out from the via hole 510 on the second film layer 500 when the plastic layer 300 is formed by the subsequent injection molding process, thereby improving the processing yield of the IME component. In addition, the circuit layer 210, the display unit 221, and the touch unit 222 on the second film layer 500 are sealed in the plastic layer 300 through the plastic layer 300, such that the appearance structure of the IME component is lighter and thinner and is not detachable, and has advantages of moisture resistance, weather resistance, impact resistance and the like. In addition, the decorative layer 110 on the first film layer 100 is sealed in the plastic layer 300 through the plastic layer 300, such that the IME component has advantages of diverse pattern changes, resistance to friction, resistance to oxidation and discoloration, corrosion resistance, environmental protection, and the like.

Figure 3:
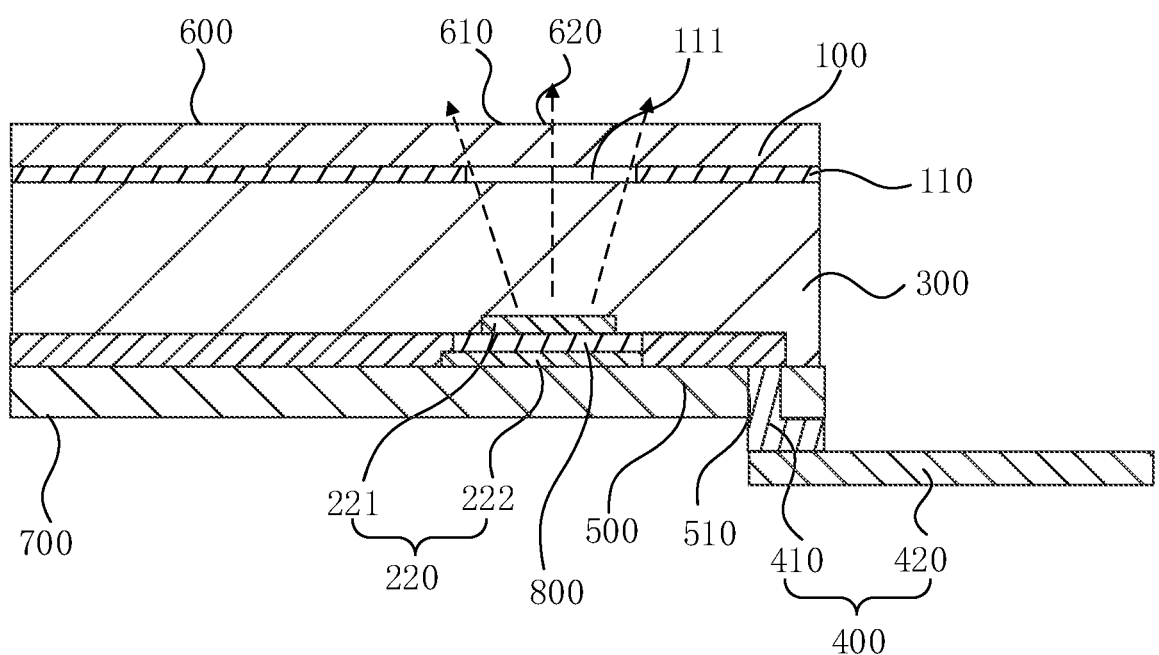
FIG. 3 is a cross-sectional view of an in-mold electronic component according to another embodiment.

In addition, it should be noted that in the embodiment shown in FIG. 1, the display unit 221 is located directly below the through hole 111, and the light emitted by the display unit 221 can directly go through the display area 610 of the IME component through the through hole 111. In other embodiments, as shown in FIG. 2, two display units 221 may also be located on opposite sides of the through hole 111, respectively. More specifically, the two display units 221 are respectively located on a side of the circuit layer 210 away from the decorative layer 110, respectively, such that the light emitted by the two display units 221 is transmitted to the through hole 111 through the plastic layer 300. Additionally, in the embodiment shown in FIG. 2, a guiding lens 223 may be provided at a light outlet of each display unit 221. The guiding lens 223 can guide the light emitted by the left display unit 221 to the right, and guide the light emitted by the right display unit 221 to the left. Therefore, the light emitted by the display units 221 is transmitted to the through hole 111 through the guiding lens 223, and then transmitted to the display area 610 of the IME component through the through hole 111. As shown in FIG. 3, in another embodiment, the display unit 221 and the touch unit 222 may also be laminated. The display unit 221 and the touch unit 222 are both located below the through hole 111, and the display unit 221 is located above the touch unit 222. An insulating layer 800 is further provided between the display unit 221 and the touch unit 222. In this case, the display area 610 and the touch area 620 of the top surface 600 of the IME component coincided with each other, which both are located above the through hole 111.

In another embodiment, as shown in FIG. 2 and FIG. 4, the decorative layer 110 is provided on the side of the first film layer 100 away from the top surface 600. The circuit layer 210 is provided on a side of the decorative layer 110 away from the first film layer 100. The plastic layer 300 is located on a side of the circuit layer 210 away from the decorative layer 110 and is used to seal the circuit layer 210 and the electronic component 220. The lead-out terminal 400 may be a pin header 430. The pin header 430 includes a connecting pin 431 and a pin head 432. A transverse size of the connecting pin 431 is greater than that of the pin head 432. The connecting pin 431 is electrically connected to the circuit layer 210. The pin head 432 extends through the plastic layer 300, and protrudes from the rear surface 700 of the IME component.

Figure 9:
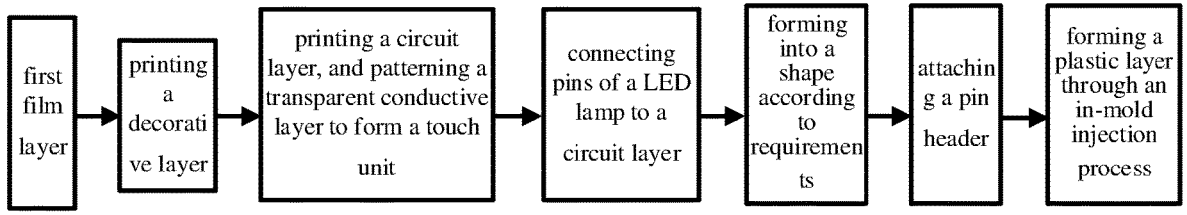
FIG. 9 is a flowchart of a method for manufacturing an in-mold electronic component according to another embodiment.

In an embodiment, a method for manufacturing the IME component shown in FIG. 4 is shown in FIG. 9. Firstly, the decorative layer 110 is printed on the first film layer 100, and then, the circuit layer 210 is printed on the decorative layer 100, and the transparent conductive layer is provided on the circuit layer 210. The transparent conductive layer is patterned by etching or other processes to form the touch unit 222 electrically connected to the circuit layer 210. Then, pins of the LED lamp are connected to the circuit layer 210, such that the circuit layer 210, the display unit 221 and the touch unit 222 are integrated on one surface of the first film layer 100. Then, the first film layer 100 is processed according to specific requirements. For example, the first film layer 100 is bent into a curved surface, such that sizes and shapes of the first film layer 100 and the functional module 200 on the first film layer 100 can meet the specific size and shape requirements. Then, the connecting pin 431 of the pin header 430 is fixed and electrically connected to the circuit layer 210. The fixing method can be, but not limited to, a method of epoxy curing or thermoplastic resin injection molding. Finally, the plastic layer 300 is formed on a side of the circuit layer 210 away from the first film layer 100 through an injection molding process, such that the decorative layer 110 on the first film layer 100, the circuit layer 210, the display unit 221, and the touch unit 222 of the functional module 200 are sealed in the plastic layer 300 though the plastic layer 300. In addition, a part of the lead-out terminal 400 is also embedded in the plastic layer 300.

In the embodiment shown in FIG. 4, through providing the pin header 430, and reasonably deploying the structure of the pin header 430, the connecting pin 431 and a part of the pin head 432 of the pin header 430 are sealed in the plastic layer 300, and the connecting pin 431 of the pin header 430 is electrically connected to the circuit layer 210. The pin head 432 extends through the plastic layer 300 and protrudes from the rear surface 700 of the IME component, such that the electronic component 220 sealed in the plastic layer 300 can be directly electrically connected to the external components through the pin header 430, the connecting cables can be avoided, thereby avoiding the bending and brittle fracture of the connecting cables, and ensuring the reliability of the electrical connection between the electronic components 220 sealed in the plastic layer 300 and the external components. In addition, the circuit layer 210, the display unit 221, and the touch unit 222 of the functional module 200 are sealed in the plastic layer 300 through the plastic layer 300, such that the appearance structure of the IME component is lighter and thinner and is not detachable, and has advantages of moisture resistance, weather resistance, impact resistance and the like. In addition, the decorative layer 110 on the first film layer 100 is sealed in the plastic layer 300 through the plastic layer 300, such that the IME component has advantages of diverse pattern changes, resistance to friction, resistance to oxidation and discoloration, corrosion resistance, environmental protection, and the like.

Figure 5:
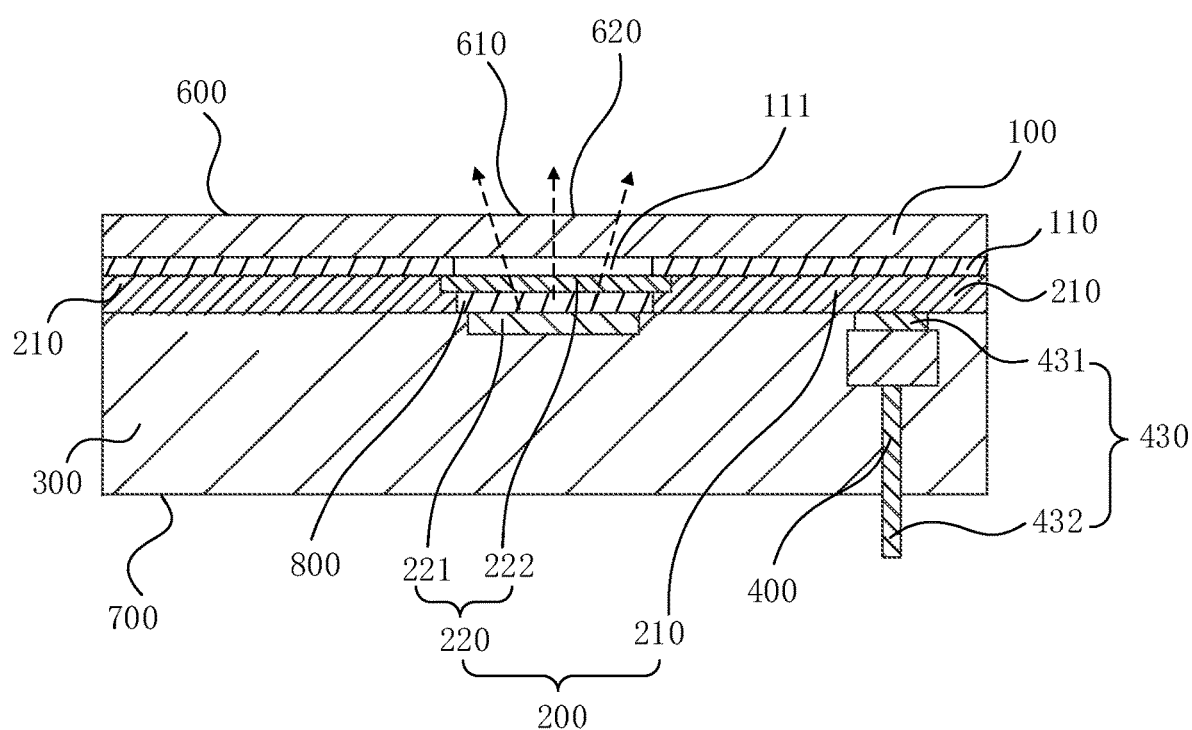
FIG. 5 is a cross-sectional view of an in-mold electronic component according to another embodiment.

In addition, it should be noted that in the embodiment shown in FIG. 4, two display units 221 are respectively located on opposite sides of the through hole 111, and light emitted by the two display units 221 is transmitted to the through hole 111 through the plastic layer 300. It is understood that, in other embodiments, the display unit 221 and the touch unit 222 may also be laminated. As shown in FIG. 5, the display unit 221 and the touch unit 222 are located below the through hole 111, and the display unit 221 is located below the touch unit 222. An insulating layer 800 is provided between the display unit 221 and the touch unit 222. It should be noted that the touch unit 222 and the insulating layer 800 are transparent layers. The light emitted by the display unit 221 can reach the through hole 111 sequentially through the insulating layer 800 and the touch unit 222, and then transmitted to the display area 610 of the IME component through the through hole 111. In this case, the display area 610 and the touch area 620 of the top surface 600 of the IME component coincided with each other, and which both are located above the through hole 111.

In addition, in the embodiments shown in FIGS. 1 to 7, the through holes 111 are provided on the decorative layer 110. The light emitted by the display unit 221 can go through the display area 610 of the IME component through the through hole 111. It is understood that, in other embodiments, a blind hole may be provided in the decorative layer 110 instead of the through hole 111, as long as the blind hole can transmit light, and the light emitted by the display unit 221 can go through the display area 610 of the IME component through the blind hole.

In addition, in the embodiments shown in FIGS. 4 and 5, the pin header 430 is a male pin header. It is understood that, in other embodiments, the pin header 430 may also be a female pin header.

Figure 6:
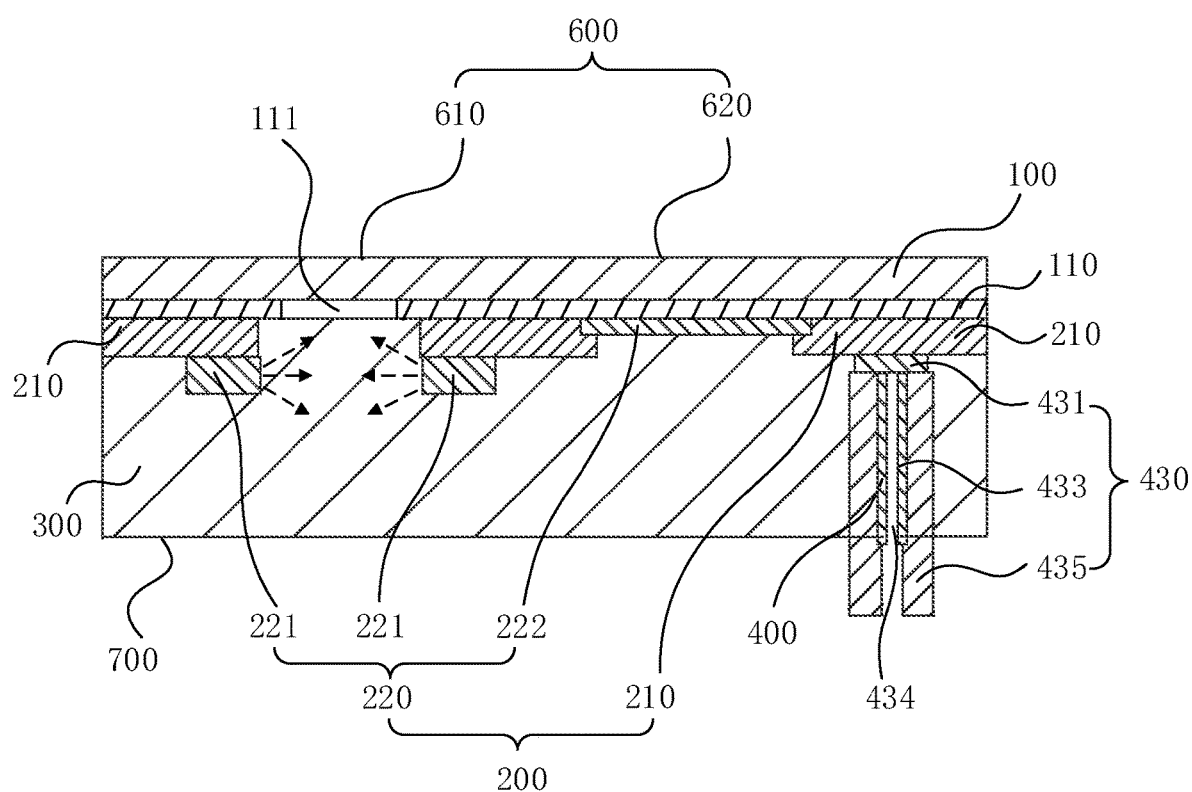
FIG. 6 is a cross-sectional view of an in-mold electronic component according to another embodiment.
Figure 7:
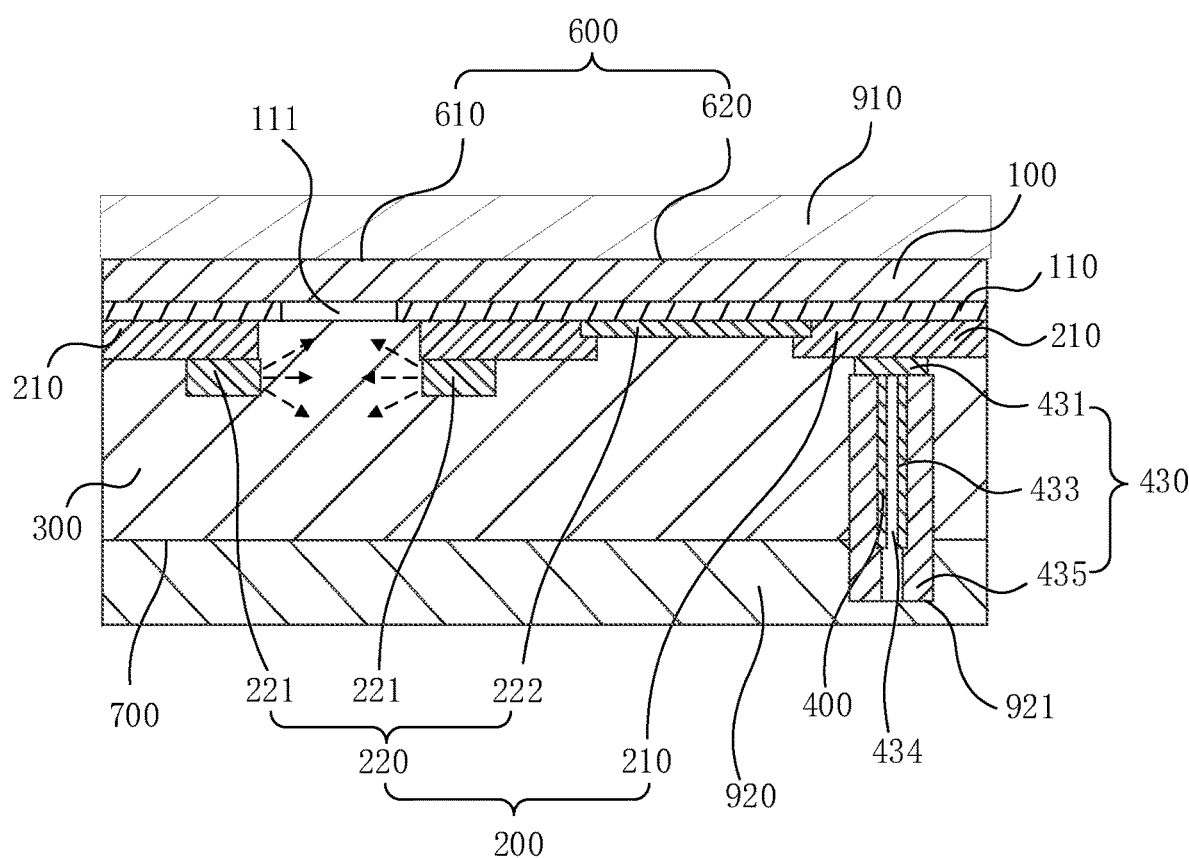
FIG. 7 is a cross-sectional view of an in-mold electronic component according to another embodiment.

As shown in FIG. 6, the pin header 430 includes a connecting pin 431, a coil portion 433, and a protective shell 435. The connecting pin 431 is electrically connected to the coil portion 433. An insertion hole 434 is formed in the coil portion 433. The protective shell 435 is sleeved on the coil portion 433. The protective shell 435 protrudes from the plastic layer 300 and protrudes from the rear surface 700 of the IME component. In the embodiments shown in FIGS. 4 and 5, the pin header 430 is the male pin header. When the plastic layer 300 is formed by an in-mold injection process, it is necessary to provide a groove in a mold cavity of a lower mold, to keep away from a protruding end of the pin head 432, and it is necessary to align the groove with the pin head 432 strictly. Otherwise, during a process of closing an upper mold 910 and the lower mold 920, the lower mold 920 will easily damage the pin head 432. In the embodiment shown in FIG. 6, the pin header 430 is the female pin header. A process of forming the plastic layer 300 through the in-mold injection process is shown in FIG. 7. As the coil portion 433 is covered with the protective shell 435, the protective shell 435 has a transverse size much greater than that of the pin head 432, such that the lower mold 920 can be aligned with the pin header 430 more easily. During the process of closing the upper mold 910 and the lower mold 920, it is only necessary to align the groove 921 of the lower mold 920 with the protective shell 435 of the pin header 430. Finally, the plastic layer 300 is formed on the side of the circuit layer 210 away from the first film layer 100 through the injection molding process, such that the decorative layer 110 on the first film layer 100, the circuit layer 210, the display unit 221, and the touch unit 222 of the functional module 200 are sealed in the plastic layer 300 through the plastic layer 300. In addition, a part of the lead-out terminal 400 is embedded in the plastic layer 300. The lead-out terminal 400 with a portion sealed in the plastic layer 300 is shown in FIG. 6 as the connecting pin 431 and the protective shell 435 with a portion covering the coil portion 433, of the pin header 430. It is understood that, in an embodiment, the male pin header shown in FIGS. 4 and 5 can be inserted into the insertion hole 434 of the female pin header shown in FIG. 6 to achieve an electrical connection.

According to the above IME components, through rationally deploying structures and connecting relationships between the first film layer 100, the functional module 200, the plastic layer 300 and the lead-out terminal 400, the first film layer 100 is provided at the top surface 600 of the IME component, the functional module 200 is sealed in the plastic layer 300, and one end of the lead-out terminal 400 is electrically connected to the circuit layer 210, and the other end of the lead-out terminal 400 is led out to the rear surface 700 of the IME component. Therefore, on the one hand, the appearance structure of the IME component is lighter and thinner, and is not detachable, and has advantages of moisture resistance, weather resistance, impact resistance and the like. On the other hand, the electronic component 220 sealed in the plastic layer 300 can be directly electrically connected to the external components through the lead-out terminal 400, the connecting cables can be avoided, thereby avoiding the bending and brittle fracture of the connecting cables, and thus ensuring the reliability of the electrical connection between the electronic component 220 sealed in the plastic layer 300 and the external components.

The technical features of the above-mentioned embodiments can be combined arbitrarily. In order to simply the description, all possible combinations of the technical features in the above-mentioned embodiments are not described. However, as long as there is no contradiction in the combinations of these technical features, they should be considered to be fallen into the range described in the present specification.

Only several implementations of the present disclosure are illustrated in the above-mentioned embodiments, and the description thereof is relatively specific and detailed, but it should not be understood as a limitation on the scope of the present disclosure. It should be noted that for those of ordinary skill in the art, without departing from the concept of the present disclosure, several modifications and improvements can be made, which all fall within the protection scope of the present disclosure. Therefore, the protection scope of the present disclosure shall be subject to the appended claims.

What is claimed is:

1. An in-mold electronic component, comprising:
    a first film layer provided at a top surface of the in-mold electronic component;
    a functional module comprising a circuit layer and an electronic component electrically connected to circuit layer;
    a plastic layer configured to seal the functional module; and
    a lead-out terminal, one end of the lead-out terminal being electrically connected to the circuit layer, and the other end of the lead-out terminal being led out to a rear surface of the in-mold electronic component;
    wherein the electronic component comprises a display unit and a touch unit, the display unit and the touch unit are both electrically connected to the circuit layer; the top surface comprises a display area corresponding to the display unit and a touch area corresponding to the touch unit, the display area and the touch area are coincided with each other, the display unit and the touch unit are laminated, and the display unit and the touch unit are provided with an insulating layer therebetween;
    wherein the first film layer is provided with a decorative layer on a side thereof away from the top surface, the circuit layer is attached to a side of the decorative layer away from the first film layer, the plastic layer is located on a side of the circuit layer away from the decorative layer and is configured to seal the decorative layer, the functional module, and a part of the lead-out terminal.

2. The in-mold electronic component according to claim 1, wherein the first film layer is provided with a decorative layer on a side thereof away from the top surface, and the decorative layer is provided with a through hole at a position corresponding to the display area, light emitted by the display unit goes through the display area via the through hole.

3. The in-mold electronic component according to claim 1, wherein the electronic component comprises two display units electronically connected to the circuit layer, the top surface comprises a display area, the decorative layer is provided with a through hole at a position corresponding to the display area, light emitted by the display unit goes through the display area via the through hole, and the two display units are located on opposite sides of the through hole, respectively.

4. The in-mold electronic component according to claim 1, further comprising a second film layer provided on the rear surface of the in-mold electronic component, wherein the plastic layer is located between the first film layer and the second film layer, and the circuit layer is located at a side of the second film layer adjacent to the plastic layer.

5. The in-mold electronic component according to claim 4, wherein the electronic component comprises a display unit and a touch unit that are both electrically connected to the circuit layer, the top surface comprises a display area and a touch area that are coincided with each other, the display unit and the touch unit are laminated, and the display unit and the touch unit are provided with an insulating layer therebetween.

6. The in-mold electronic component according to claim 4, wherein the electronic component comprises two display units that are electronically connected to the circuit layer, the top surface comprises a display area, the decorative layer is provided with a through hole at a position corresponding to the display area, light emitted by the display unit goes through the display area via the through hole, the two display units are located on opposite sides of the through hole, respectively; or the display units are located below the through hole.

7. The in-mold electronic component according to claim 4, wherein the second film layer is provided with a via hole, the lead-out terminal comprises a flexible printed circuit and a conductive material filled in the via hole, one end of the conductive material is electrically connected to the circuit layer, and the other end of the conductive material is electrically connected to the flexible printed circuit.

8. The in-mold electronic component according to claim 1, wherein the circuit layer is located at a side of the first film layer away from the top surface, the plastic layer is located on a side of the circuit layer away from the first film layer and is configured to seal the decorative layer, the circuit layer, and the electronic component.

9. The in-mold electronic component according to claim 1, wherein the lead-out terminal is a pin header comprising a connecting pin electrically connected to the circuit layer and a pin head extending through the plastic layer, and the pin head protrudes from the rear surface of the in-mold electronic component.

10. The in-mold electronic component according to claim 9, wherein the connecting pin and a part of the pin head are embedded in the plastic layer.

11. The in-mold electronic component according to claim 1, wherein the lead-out terminal comprises a connecting pin, a coil portion, and a protective shell, the connecting pin is electrically connected to the coil portion, the coil portion forms an insertion hole therein, the protective shell is sleeved on the coil portion, the protective shell protrudes from the plastic layer and protrudes from the rear surface of the in-mold electronic component.

* * * * *